United States Patent [19]
Gitto

[11] Patent Number: 4,933,794
[45] Date of Patent: Jun. 12, 1990

[54] HEAD FOR READING A MAGNETO-OPTICAL DATA CARRIER

[75] Inventor: Luigi Gitto, Albiano d'Ivrea, Italy

[73] Assignee: Ing. C. Olivetti & C., S.p.A., Ivrea, Italy

[21] Appl. No.: 193,579

[22] Filed: May 13, 1988

[30] Foreign Application Priority Data

May 21, 1987 [IT] Italy ............... 67445 A/87

[51] Int. Cl.⁵ .......................... G11B 5/127
[52] U.S. Cl. ................... 360/114; 350/400; 358/335
[58] Field of Search .............. 360/114; 369/13, 44–46, 369/106, 109, 110; 350/400–405; 358/128; 365/121–122

[56] References Cited

U.S. PATENT DOCUMENTS

| | | | |
|---|---|---|---|
| 4,451,863 | 5/1984 | Vanagida et al. | 360/114 |
| 4,573,149 | 2/1986 | Deguchi et al. | 369/13 |
| 4,607,359 | 8/1986 | Matsubayashi et al. | 369/46 |
| 4,764,912 | 8/1988 | Ando | 360/114 X |

OTHER PUBLICATIONS

"Signal Noise, and Codes in Optical Memories", Optical Engineering/Jul., vol. 25, No. 7, pp. 881–891.
"Eraseable Magneto–Optical Recording", Phillips Technical Review/vol. 42, No. 2, Aug. 1985.

Primary Examiner—A. J. Heinz
Attorney, Agent, or Firm—Banner, Birch, McKie & Beckett

[57] ABSTRACT

Data is recorded on a magneto-optical carrier (5), the magnetization of which in each recorded area is capable of reflecting a polarized laser beam (28,31,33) with rotation of the plane of polarization due to the Kerr effect in accordance with the direction of megnetization of the area. The plane of polarization of the beam (33',31',28',34) which is reflected in that way is rotated through about 45° by a half-wave plate (35), the output beam (36) of which is resolved into two components by a prism (39). They are such as to permit discrimination between the two reading signals produced by respective detectors (43,44) in accordance with the sign of the output of a comparator (45).

5 Claims, 1 Drawing Sheet

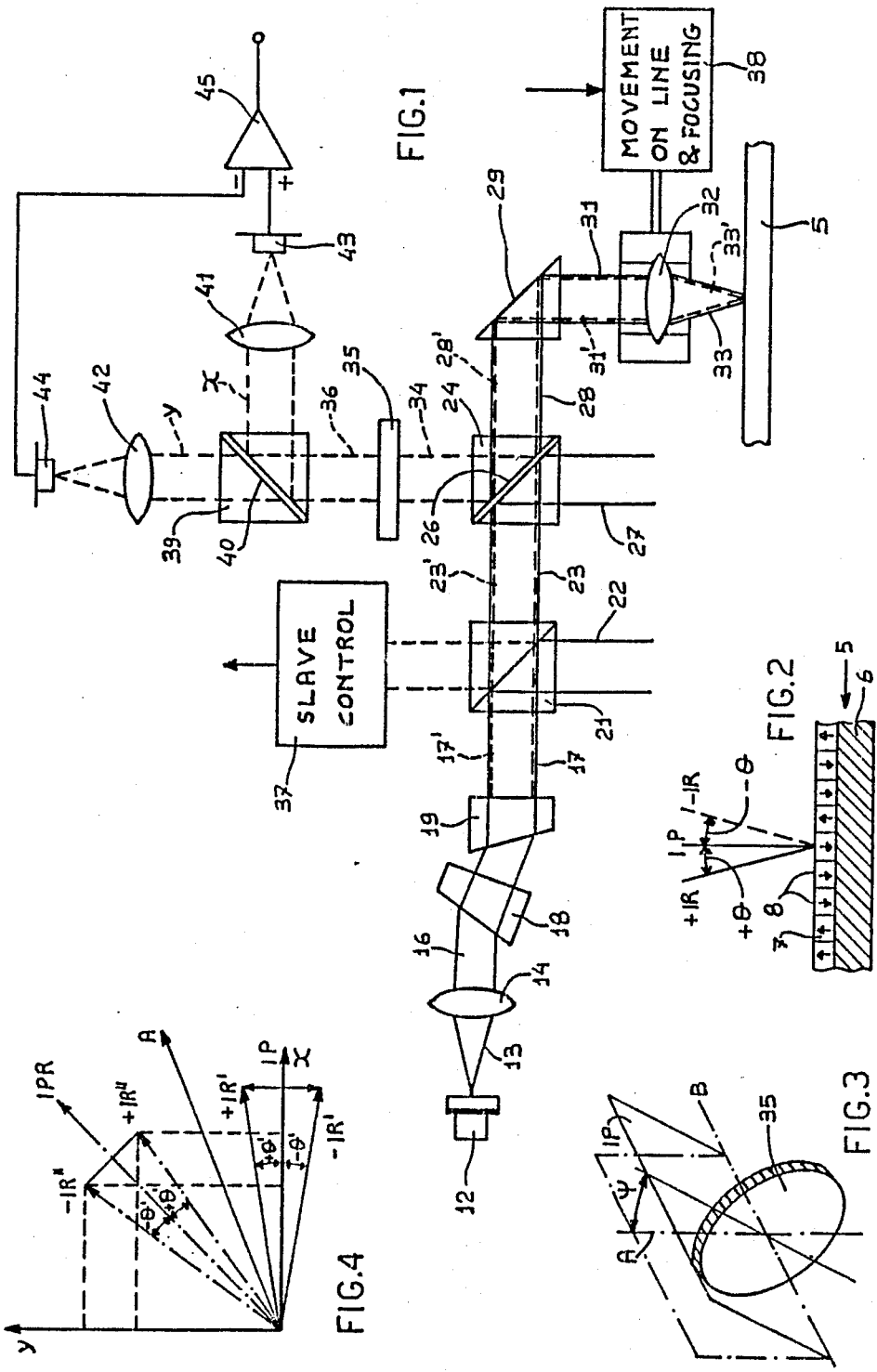

HEAD FOR READING A MAGNETO-OPTICAL DATA CARRIER

BACKGROUND OF THE INVENTION

1. Field of the Invention

The present invention relates to a head for reading a data carrier on which recorded data exerts a magneto-optical effect on a laser beam, in which a polarised laser beam emitted by the head is reflected by the carrier with rotation of the plane of polarisation which is dependent on the direction of magnetisation of the recording.

2. Description of the Related Art

In a reading apparatus of the above-indicated type which is disclosed in U.S. Pat. No. 4,451,863, the planes of polarisation of the incident beam and the reflected beam are rotated by two differnt Faraday elements. Since each Faraday element is formed by a block of transparent material which is disposed in an electrical winding operable to generate a predetermined magnetic field, that apparatus is relatively bulky and is not suitable for a miniaturised reading head.

In addition one of the two Faraday elements causes rotation of the plane of polarisation of the incident beam through 45° while the other causes rotation of that plane through a further 22.5° and the reflected plane through a further 22.5° so that the latter is then orthogonal with respect to the incident beam. Rotation due to the Kerr effect is thus broken down in accordance with two orthogonal planes, so that because of the slight degree of that rotation it is relatively imprecise.

It has also been proposed that the plane of polarisation of both the incident beam and the reflected beam may be rotated by means of a plate of a doped dielectric material, the plate being formed by layers of crystals which are oriented along a suitably inclined axis with respect to the plane of polarisation of the optical beam. The component of rotation due to the Kerr effect is then amplified to about 45° so that the two beams created by the operation of reading two magnetised areas are at 90°. A beam splitter makes it possible in that way to block one of the two beams and to pass the other beam, so that one of the two signals is zero. However that apparatus is not very reliable since the absence of signal can be interpreted as the presence of the beam corresponding to the signal zero.

SUMMARY OF THE INVENTION

The object of the invention is that of providing a reading head which can be incorporated into a miniaturised head and which is capable of generating two clearly different signals in response to the two rotations due to the Kerr effect.

That object is met by a head for reading a data carrier of the above type, which is characterised by means for rotating the plane of polarisation of the reflected beam in such a way as to permit marked differentiation of the reading signals.

These and other features of the invention will be more clearly apparent from the following description of a preferred embodiment which is given by way of non-limiting example, with reference to the accompanying drawing.

BRIEF DESCRIPTION OF THE DRAWINGS

FIG. 1 is a diagrammatic view of an optical system for a reading head according to the invention, FIG. 2 is a diagrammatic view illustrating the operating principle of reading a magneto-optical support, FIG. 3 is a diagrammatic view illustrating the principle of generating the reading signals, and FIG. 4 is a diagram illustrating the result of the reading operation carried out with the head shown in FIG. 1.

DESCRIPTION OF THE PREFERRED EMBODIMENT

The recording of data which can be read by means of a magneto-optical effect on a laser beam is carried out on a multi-layer carrier 5 (see FIG. 2), for example in the form of a disc. The carrier 5 comprises a metal reflecting layer 6 and a thin layer 7 of magnetically recordable material in which the individual areas 8 recorded are magnetised selectively in two directions perpendicular to the layer, as shown in FIG. 2 by the associated arrows.

A polarised laser beam which is incident on the carrier 5, passing through the magnetised layer 7, is reflected by the layer 6 as a reflected but polarised beam whose plane of polarisation is rotated with respect to the plane of polarisation by a predetermined angle $\theta$ in a direction dependent on the direction of magnetisation of the area 8 of the layer 7 through which the beam passes. It will be referred to hereinafter as $+\theta$ if it is caused by an area 8 of the layer 7 whose magnetisation is indicated by the downwardly directed arrow while it will be identified by $-\theta$ if it is produced by an area 8 whose magnetisation is indicated by the upwardly directed arrow. FIG. 2 by way of illustration indicates at IP the plane of polarisation of the incident laser beam, while $+$IR denotes the plane of polarisation of the reflected beam which is rotated through the angle $+\theta$ and $-$IR denotes the plane of polarisation of the reflected beam which is rotated through the angle $-\theta$.

The magnitude of the angle $\theta$ depends on the thickness of the layer 6 and the strength of the magnetic field through which the beam passes. That rotation which is known as the Kerr effect, for the known materials, is of a very low value, of the order of 4–5 tenths of a degree.

The head for reading the support 5 comprises a laser diode 12 (see FIG. 1) which is controlled by a control circuit known per se for generating a polarised laser beam 13, the wavelength of which may be for example 830 nm (1 nm = $10^{-9}$ m). The beam 13 is normally divergent so as to form a conical beam configuration of elliptical section. It is collimated by a lens 14 which is such as to form at its output a parallel beam configuration 16 which is still of elliptical section. It will be appreciated that the lens 14 may be replaced by a system of lenses such as to provide for corrections in respect of aberration and astigmatism.

The collimated beam 16 is transformed into a beam 17 of circular section by a pair of anamorphic optical prisms 18 and 19. They are identical to each other and have their two inclined faces in mutually facing relationship and oriented in such a way as to increase the divergence in the direction of the minor axis of the ellipse of the section.

The beam 17 is then passed to a double prism 21 for splitting the optical beam (beam splitter) which reflects downwardly in FIG. 1 a part 22 of the beam which is thus lost. Another part of the beam is transmitted directly through the transparent prism, forming an optical beam 23 whose luminous intensity is substantially half that of the beam 17.

The beam 23 is passed to a polarised beam splitter prism 24 provided with a polarised dielectric layer 26 which reflects downwardly the component 27 of the beam 23 which is external to the theoretical plane of polarisation of the diode 12, which component may have been introduced in the preceding optical paths. On the other hand, a perfectly polarised parallel laser beam 28 passes through the layer 26, the laser beam 28 being reflected in an almost unaltered condition as a beam 31 by a right prism 29. The beam 31 is focused by a lens 32 on the line of recording on the support 5 as a conical beam 33, the plane of polarisation of which is identified at IP in FIG. 2.

The beam 33 now passes through the layer 7 of the support 5 which is magnetically recorded and is reflected by the surface of the layer 6. A reflected laser beam 33' which is indicated by broken lines in FIG. 1 is then generated. The plane of polarisation ±IR of the beam 33', due to the Kerr effect, has a rotation ±θ with respect to the plane of polarisation of the incident laser beam 33.

The reflected beam 33' is then collimated by the lens 32 which thus generates a parallel beam 31'. The latter is reflected by the prism 29 as a beam 28' which thus goes to the polarised prism 24. Since the plane of polarisation of the beam 28' is rotated with respect to that of the beam 28, the layer 26 now permits the passage of the component 23' lying in the plane of polarisation IP, which is the main one. In practice, because of impurities in the prism 24, about 98% of the luminous intensity of the component lying in the plane IP is transmitted, whereby the reading signal is substantially cleared of background noise. The remaining 2% of the luminous intensity of the beam 28' in the plane IP is reflected upwardly by the layer 26 together with the component of the beam 28' in the plane which is transverse with respect to the plane of polarisation IP, forming an optical beam 34. The transverse component is that which reveals the rotation due to the Kerr effect.

In FIG. 4 the plane of polarisation IP is disposed on the axis x of the Cartesian diagram while the planes of polarisation of the beam 34 are indicated by +IR' and −IR' and lie on the first and fourth quadrants of the diagram. In practice the planes of polarisation +IR' and −IR' of the beam 34 are rotated with respect to the plane of polarisation IP through an angle of ±θ' of around five times the angle ±θ of rotation of the beam 33' due to the Kerr effect.

In accordance with the invention, the plane of polarisation of the reflected beam is further rotated in such a way as to permit clear differentiation of the reading signals. For that purpose disposed on the path of the optical beam 34 is a half-wave plate 35 which is capable of emitting a beam 36 whose plane of polarisation which is capable of producing an electrical signal that is proportional to the luminous intensity of the beam component received. The two photodiodes 43 and 44 pass the signals to a signal comparator 45 which produces the difference between thee signals x−y and outputs a signal which is clearly positive if x>y and a signal which is negative if x<y.

It will be clear from the foregoing that the rotation of the plane of polarisation which is produced by the plate 35 and the subsequent breaking down of the beam or light ray which is produced by the prism 39 make the two components x and y of the beam 36 substantially of the same order of magnitude, both when the beam 36 is polarised in the plane +IR" and when it is polarised in the plane −IR". It will also be clear that the reading signals produced by the comparator have in each case a result which differs from zero, thereby eliminating disadvantages due to incorrect interpretation of an accidental absence of a signal.

It will be appreciated that various modifications, improvements, additions or substitution of parts may be effected in the above-described apparatus without thereby departing from the scope of the claims. For example the diode 12 may be capable of producing a laser beam with a wavelength of 780 nm instead of 830 nm. Also the half-wave plate 35 may be mounted in such a way as to be capable of adjusting the direction of the optical axis A which is the basis for the planes of polarisation defined by the prism 24. In addition the two detectors 43 and 44 may be mounted in aligned relationship, using a reflecting prism and a different focal length for one of the two lenses. It is also possible to replace the polarised prism 24 by a non-polarised beam splitter prism. There will then be an increase in the noise component in the reflected beam 34 but the component due to the Kerr effect is also emphasised by the plate 35. Finally the difference x−y may be standarised by means of a circuit known per se in such a way as to define the reading signal as the ratio (x−y)/(x+y), whereby the level of sensitivity of the apparatus is increased.

I claim:

1. A head for reading a data carrier (5) carrying a magnetizable layer, in which the data recorded thereon are represented by two opposite directions of magnetization of said magnetizable layer, said magnetizable layer exerting magneto-optical effect on a laser beam impinging on said magnetizable layer depending on the direction of said magnetization, and in which a laser beam (28, 31, 33) emitted by said head is polarized on a predetermined polarization plane and is reflected by said carrier (5) with a rotation of said plane of polarization (IP) of said beam which is dependent on the direction of said magnetization, comprising means (35) for rotating the plane of polarization of a reflected beam (33', 31', 28', 34) in such a way as to permit a marked differentiation of reading signals, wherein said means (35) comprise an optical half-wave plate whose optical axis (A) forms an angle of about 22.5° with the plane of polarization (IP) which said reflected beam (33', 31+, 28', 34) would have in the absence of a rotation as a result of the reflection of said magnetizable layer on said carrier (5).

2. A head according to claim 1, characterized in that said reflected beam (33', 31', 28') is polarized by a polarized beam splitter prism (24) which is oriented in such a way as to reflect out the component (24) of said reflected beam which is not disposed in said predetermined plane of polarization (IP) for being rotated by said half-wave plate (35).

3. A head according to claim 2, wherein said polarized beam splitter prism (24) allows the passage of the component (23') of said reflected beam which is disposed in said predetermined plane of polarization (IP) to be passed to a circuit (37,38) for controlling automatic focusing of a head and for automatic control of said head in relation to the position of the line of recording on the carrier (5).

4. A head according to claim 1, wherein the output beam (36) deriving from said reflected beam (33', 31', 28', 39), and rotated by said half-wave plate (35) is resolved by a polarized prism (39) into two orthogonal components (x, y) which are capable of being read by two corresponding optical detectors (43, 44).

5. A head according to claim 4 characterized in that electrical signals emitted by said detectors (43, 44) are algebraically compared by a comparator (45), whose output assume opposite signs in correspondence with said two opposite directions of magnetization of the recording.

* * * * *